May 23, 1933.  J. H. MONTGOMERY  1,910,626
AEROPLANE AEROFOIL WING
Filed Feb. 18, 1931  3 Sheets-Sheet 1
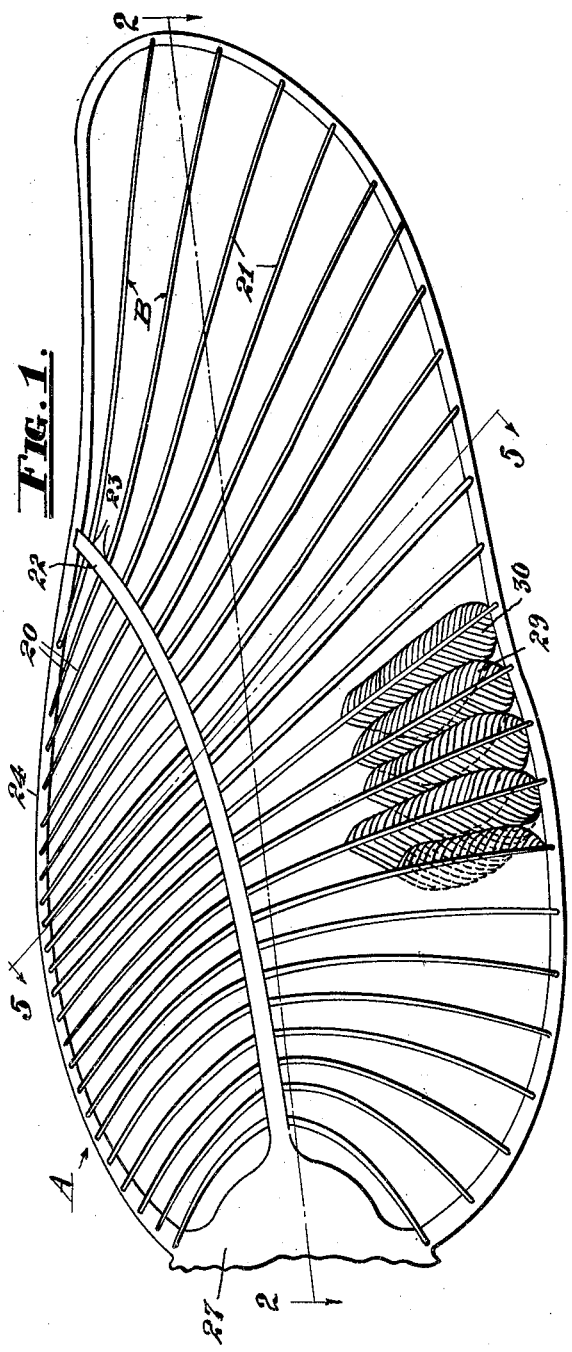
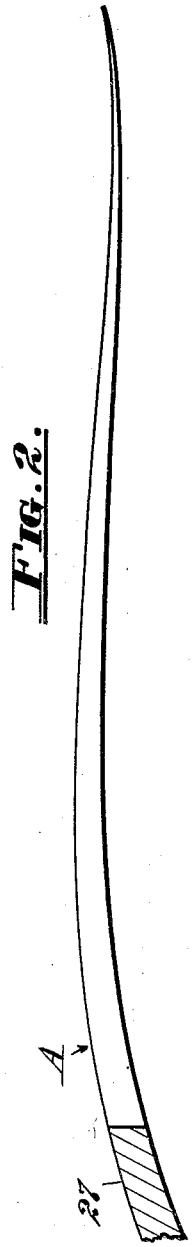
Inventor
Jay H. Montgomery.
By
Attorney May 23, 1933.　　　J. H. MONTGOMERY　　　1,910,626
AEROPLANE AEROFOIL WING
Filed Feb. 18, 1931　　　3 Sheets-Sheet 2
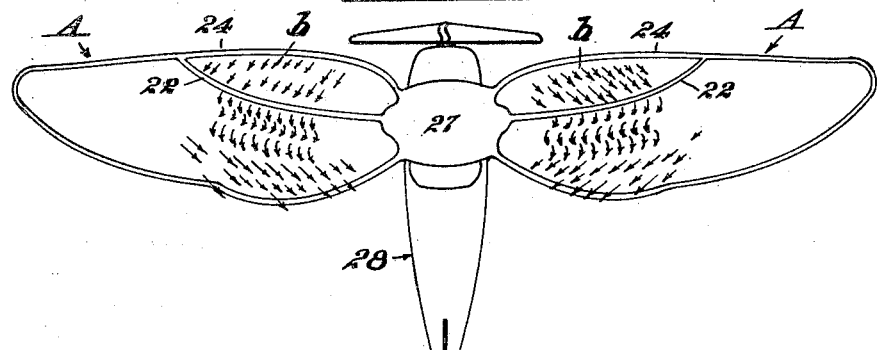
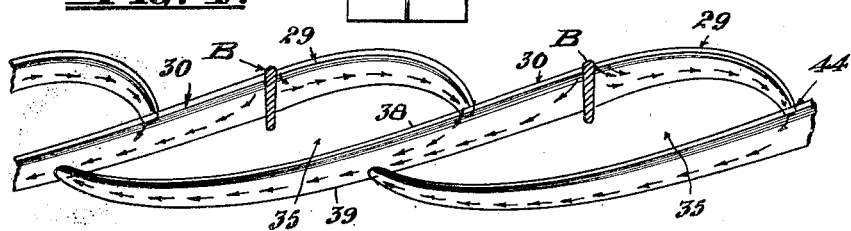
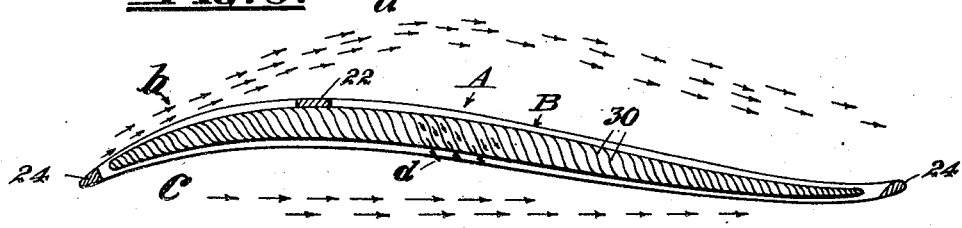
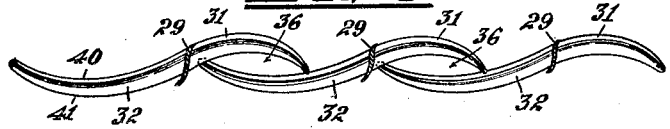
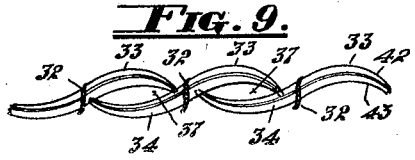
Inventor
Jay H. Montgomery.
By
*R. S. Berry*
Attorney May 23, 1933. J. H. MONTGOMERY 1,910,626
AEROPLANE AEROFOIL WING
Filed Feb. 18, 1931 3 Sheets-Sheet 3
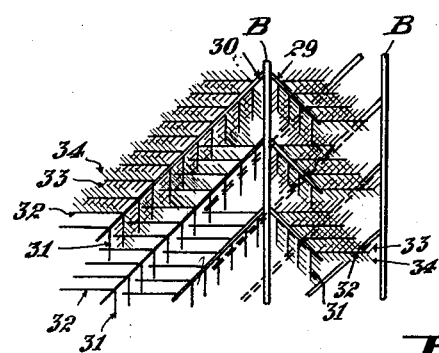
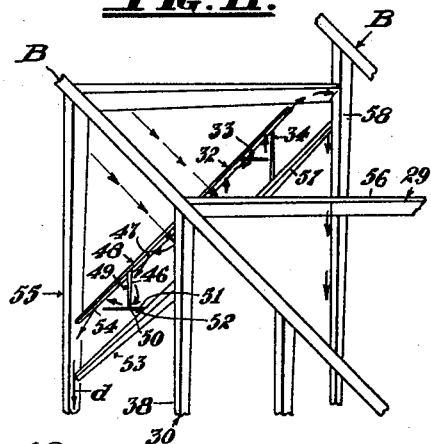
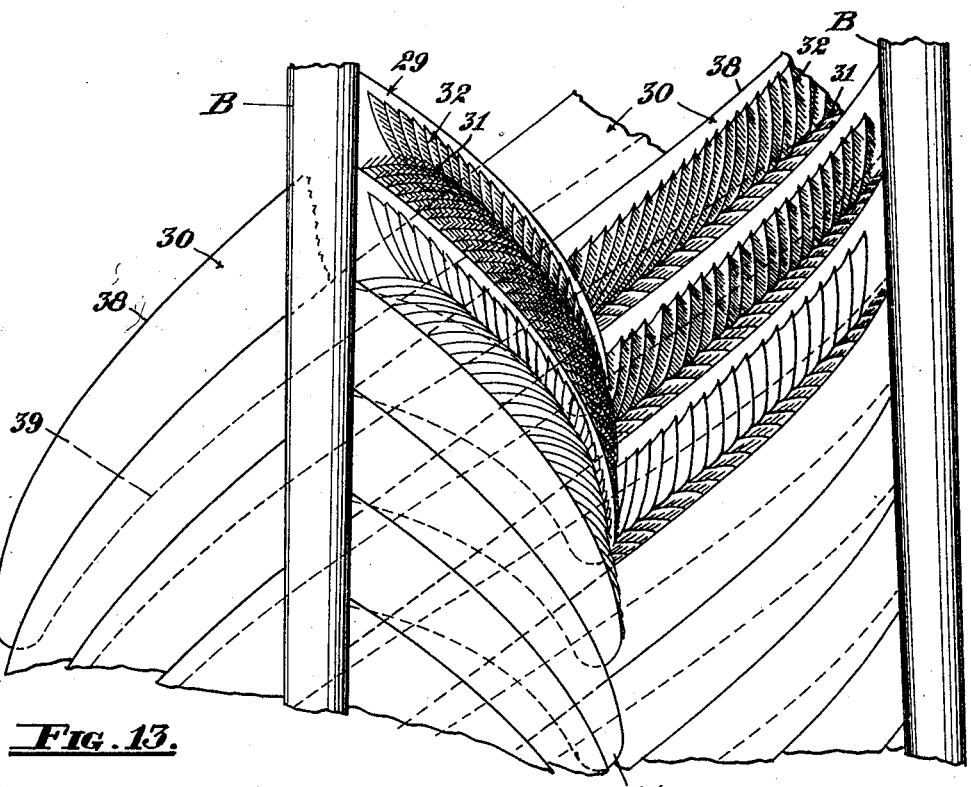
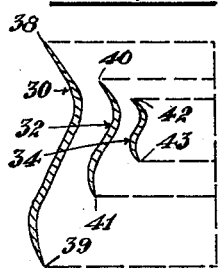
Inventor
Jay H. Montgomery.
By
Attorney Patented May 23, 1933

1,910,626

UNITED STATES PATENT OFFICE

JAY H. MONTGOMERY, OF SAN GABRIEL, CALIFORNIA, ASSIGNOR TO VORTEX WING CORPORATION, OF LOS ANGELES, CALIFORNIA, A CORPORATION OF DELAWARE

AEROPLANE AEROFOIL WING

Application filed February 18, 1931. Serial No. 516,532.

This invention relates to aerofoil wings for aeroplanes and flying machines, and its objects are to provide wings which, in flight, tend to create and retain a high vacuum within their limits, whereby higher speed with decreased power may be attained, piloting may be accomplished with minimum effort and maximum efficiency, take-off and landing speed may be reduced to fifteen miles per hour, a much smaller motor may be used for successful flight, and whereby less fuel may be used.

These objects are attained by constructing the wing with an aerofoil contour from base to tip, an aerofoil contour from the leading edge to the trailing edge, and embodying therein a plurality of spaced apart supporting ribs, primary aerofoil blades superimposed on and leading from the ribs, secondary aerofoil blades superimposed on and leading from the primary blades, and tertiary blades or vanes superimposed on and leading from the secondary blades, all blades and vanes having cooperative degrees of overlap or underlap, cooperative leading and trailing edges, cooperative aerofoil displacement, cooperative angles of incidence, cooperative contours, and collectively forming a multiplicity of vacuum spaces within the limits of the wing, a multiplicity of channels around the vacuum spaces, and a multiplicity of intersections of the channels, whereby impinging air currents are entrained, deflected, stepped up in velocity, transformed into a multiplicity of vortices circulating around the vacuum spaces, and finally discharged with their augmented velocity from the trailing edge of the wing; having in the meantime, drawn the air from the enclosed vacuum spaces and produced a high vacuum within the limits of the wing.

The invention comprehends an organization of aerofoil elements, whereby air flows, torques, and increased velocities and pressures thereof, created by primary elements, intercommunicate with and augment secondary air flows, torques, and increased velocities and pressures thereof, thereby securing lateral and longitudinal stability, preventing deflection of an aeroplane from its course of travel, and facilitating and rendering safer the operations of launching and landing.

With the foregoing objects in view, together with such other objects and advantages as may subsequently appear, the invention resides in the parts and in the combination, construction and arrangement of parts, hereinafter described and claimed and illustrated by way of example in the accompanying drawings, in which:

Figure 1 is a top plane view of an aerofoil wing, embodying the features of the invention, and showing the outer frame, the supporting ribs, and a few of the primary blades leading from the ribs;

Figure 2 is a diagram in longitudinal section of the wing as seen on the line 2—2 of Figure 1, with the ribs and blades removed, depicting the general longitudinal curvature of the wing;

Figure 3 is a top plane view of an aeroplane having aerofoil wings, embodying the invention and indicating by arrows, the general flow of air currents relative to the wings as a whole;

Figure 4 is a fragmentary detail view, showing adjacent ribs of the wing in section, the underlap of primary blades, the vacuum spaces formed thereby, and indicating by arrows the flow of air currents;

Figure 5 is a transverse section of a wing, taken on line 5—5 of Figure 1 showing the curvature of the wing from the leading edge to the trailing edge thereof;

Figure 6 is a perspective detail view of a major primary trailing blade as detached;

Figure 7 is a perspective detail view of a minor primary leading blade as detached;

Figure 8 is a fragmentary detail view showing the overlap of primary and secondary blades on the trailing portion of the wing;

Figure 9 is a fragmentary detail view showing the overlap of secondary blades and tertiary vanes on the leading portion of a wing;

Figure 10 is a diagram showing the relative position of the aerofoil blades and vanes, by single lines;

Figure 11 is a diagram, showing by arrows, the travel of air currents relative to the aerofoil blades and vanes;

Figure 12 is a fragmentary and enlarged plan view of a portion of a wing, showing relative positions of main, primary, and secondary blades and tertiary vanes;

Figure 13 is a sectional detail view, showing the base sections of primary, and secondary blades and tertiary vanes, showing the relative widths thereof and also showing the reverse curve or oppositely curved contours thereof in the direction of their width.

Referring to the drawings more specifically, A indicates generally the aerofoil wing which includes a series of ribs B which lead from points along the leading edge of the wing to points along the trailing edge thereof and are formed at their forward end portions with longitudinally up-curved lead sections 20 and at their rear end portions with longitudinally curved trail sections 21 thus imparting to the wing structure an aerofoil contour, that is with a double or reverse curvature in section from the base to the tip of the wing as shown in Figure 2, and from the leading edge to the trailing edge of the wing as shown in Figure 5. A brace or tie rib 22 extends transversely of the ribs B and is connected thereto at the meeting points 23 of the lead and trail sections.

A frame member 24 is connected to the extremities of all the ribs B and constitutes the margin of the wing. Opposed wings A are connected together as by brace 27, projecting from the aeroplane body 28.

Interposed between the ribs B is a manifold furcation, comprising primary minor blades 29, primary major blades 30, leading from opposite sides of the ribs; secondary minor blades 31, and secondary major blades 32, leading from opposite sides of the primary blades; and spaces tertiary minor blades or vanes 33, and spaced tertiary major blades or vanes 34, leading from opposite sides of the secondary blades. Each blade and vane leads from its supporting blade or rib at an angle of 45°, and has its upper minor portion inclined forwardly at an angle of 45°. The primary minor blades 29 are approximately one-third the length of the major primary blades 30. The secondary minor blades 31 are approximately one-half the length of secondary major blades 32, which proportions obtain in the tertiary blades or vanes 33 and 34. The primary major blades 30 underlap the primary minor blades 29 of the adjacent rib, and also the adjacent major primary blades, thereby collectively forming vacuum spaces 35, which extend throughout the length of the assembled blades. The secondary blades overlap each other to form vacuum spaces 36, and the tertiary blades or vanes overlap each other to form vacuum spaces 37. All blades and vanes have the same characteristic curves, surfaces, and edges. Primary blades have upper lead edges 38, and lower trail edges 39; secondary blades, upper lead edges 40, lower trail edges 41, and tertiary blades or vanes, upper lead edges 42, and lower trail edges 43.

Each blade, whether a primary blade, a secondary blade, or a tertiary blade or vane has a certain longitudinal curve adjacent to the base, and an oppositely curved portion adjacent to the tip, and each blade and vane is likewise curved from its leading edge to its trailing edge, the formation being a reverse or double curve, and therefore, an aerofoil contour longitudinally and transversely thereof.

The aerofoil wings embody physical features, action, and effects that obtain in the wings of a soaring bird. Displacement, angle of incidence, contour of blades and vanes, and flow of air currents therebetween, are similar to those of feathers. All blades taper from base to tip, providing channels therebetween of gradually decreasing area. The primary blades, secondary blades, and tertiary blades or vanes are of decreasing size in the order named, the ratio being approximately twenty to one.

Considering the wing as a whole, air currents $a$ are deflected upwardly, thereby forming a partial vacuum on the upper side of the wing and exerting a lifting force as in ordinary aeroplane wings. Arrows $b$ indicate impinging air currents. Arrows $c$ indicate air currents beneath the wing. Arrows $d$ indicate channel currents of air discharging from the wing. The $c$ currents tend to pull the $d$ currents from the wings, and tend to lift the wing. The vacuum induced by currents $a$ augments the velocity of $d$ currents, and all currents create a reactive force to push the wings forwardly. Impinging air currents $b$ are entrained by the aerofoil blades, deflected, transformed into thousands of vortices with their accompanying vacuums and suctions, and finally compounded into discharging $d$ currents.

Considering the action and effects of the primary blades, reference is had to Figure 4, of the drawings. The major primary blades 30, having leading edges 38 to intercept impinging currents. The intercepted currents pass down their length, being sub-deflected in a manner hereinafter set forth, and finally reach the tips, where the currents are dumped upon deflecting faces adjacent to trailing edges 39, of major primary blades extending from an adjacent rib. The flow of currents is indicated by arrows. The underlap of primary blades forms vacuum spaces 35, and vortices circulating therearound, pull the air from the vacuum spaces.

Likewise, impinging currents are deflected by leading edges of minor primary blades, sub-deflected in a manner hereinafter set forth, finally reaching the tips, where the currents are dumped beneath the leading edges of adjacent major primary blades, to unite with and augment other currents flowing therealong. Major primary blades are exposed to impinging currents, only between the supporting rib 21, and the tips 44, of adjacent minor primary blades. The many vortices produced by the many deflected currents, cooperate to produce a high vacuum within the enclosed vacuum spaces.

The action of primary blades only, has so far been set forth, but each primary blade includes an assembly of secondary and tertiary blades or vanes. Considering the sub-deflections, reference is had to Figure 11 of the drawings. An impinging air current is intercepted by leading edge 38, of a major primary blade 30, is deflected diagonally downward and impinged on the side 47, of major secondary blade 48, leading from said primary blade 30. On secondary blade 48, the current starts to flow diagonally downward, but is intercepted by leading edge 46, of tertiary vane 49, and, being deflected diagonally downward, is deflected by vane tip 50, and impinges on trailing edge 51, of adjacent tertiary major vane 52, extending from an adjacent major secondary blade 53, extending from the primary blade 30. From trailing edge 51, the current is deflected to the lower trailing edge 54, of secondary blade 48, and is deflected thereby, traveling downwardly and outwardly, and is impinged on the lower trailing edge of a major primary blade 55, finally compounding with other currents to form discharging $d$ currents. An impinging air current is intercepted by the leading edge 56, of a minor primary blade 29, and is deflected to a secondary major blade 32, leading from minor blade 29.

The current is then deflected and impinges on a minor tertiary vane 33, traveling to the tip thereof which deflects the current to an adjacent major tertiary vane 34, leading from an adjacent secondary blade 57. From vane 34, the current is deflected back to vane 33, and to the lower trailing edge thereof, and flows to the tip thereof, being dumped upon the adjacent primary major blade 58, leading from an adjacent rib. As the currents are dumped onto other blades and vanes, the cycles of action are repeated.

The major currents and vortices are finally dumped into the trailing edge channels, the vortices becoming air currents $d$, and all flowing from major trails to major trails and on a 45° angle across the wing and toward the aeroplane body, and finally discharging from the rear edge of the wing; which is the concentrating point of all currents and vortices.

Vortices are formed by deflecting the air currents, and by impinging the deflected air currents into other air currents at an angle, whereby a whirling motion of the united currents is attained; the deflections being due to displacement, angle of incidence, and arrangement of the several classes of blades. Vacuums are low as currents and vortices begin in the primary minor spaces and channels, and increase, step by step, through primary, secondary, and tertiary spaces and channels in the order named. Then as the currents and vortices are transposed to major tertiary, major secondary, and finally major primary spaces and channels, the higher vacuums are attained.

Through a cycle of action, all forces become additive, and each time an action or force repeats, it increases the general effectiveness as a whole. As currents and vortices are dumped on adjacent deflecting elements, they receive added impetus due to turned in tips and edges of the blades. Each deflection directs to smaller spaces, and each constriction of area increased air current velocity.

As currents flow through successive cycles of action, they follow a tortuous course, and each deflection induces a reactive force to impel the aeroplane with a forward movement. The successive productions of vortices, and augmenting thereof, result in high ultimate velocity of the air currents leaving the wing; the velocity being six or more times the velocity of the impinging currents, depending on velocity of flight, and number and inclination of the several classes of blades.

Currents flowing over a leading edge and impinging on the trailing rear surface of a primary blade are positive in action, their angle of incidence serving to aid forward movement of the wing. Negative currents, impinging under the leading edges of primary blades, are in opposition to forward movement of the wing, and primarily produce a drag, but, however, they are diverted in such a manner that their energy is utilized to aid forward movement of the wing.

I claim:

1. An aeroplane aerofoil wing, comprising a plurality of primary aerofoil blades spaced apart from one another to form a multiplicity of aerofoil channels throughout the wing structure, said blades overlapping and underlapping one another to form vacuum spaces, a plurality of secondary aerofoil blades attached to and supported by the primary blades, and similarly overlapping one another to form secondary vacuum spaces, a plurality of tertiary aerofoil vanes attached to and supported by each secondary blade, and similarly overlapping one another to form tertiary vacuum spaces, and ribs supporting the primary blades, the arrangement being such that the flow of air currents through the aerofoil channels creates high vacuums within the vacuum spaces.

2. An aeroplane aerofoil wing, comprising a structure having an aerofoil contour from base to tip, and an aerofoil contour from front edge to rear edge thereof, said structure including spaced apart ribs, and a multiplicity of aerofoil blades disposed between and supported by the ribs, the blades being spaced apart to form aerofoil channels, and overlapping and underlapping to form vacuum spaces, the arrangement being such that impinging air currents are diverted to flow in tortuous paths through the aerofoil channels and thereby draw the air from the vacuum spaces.

3. An aeroplane aerofoil wing, comprising a structure having an aerofoil contour from base to tip, an aerofoil contour from the front edge to the rear edge, and embodying a plurality of supporting ribs spaced apart relative to one another, a plurality of primary blades fixed to and extending from the ribs, a plurality of secondary blades fixed to and extending from the primary blades, and a plurality of tertiary vanes fixed to and extending from the secondary blades, said blades and vanes having cooperative aerofoil displacement, angles of incidence, and contour to form and enclose a multiplicity of vacuum spaces, and form a multiplicity of channels around the vacuum spaces, whereby impinging air currents are entrained, deflected, increased in velocity, transformed into a multiplicity of vortices circulating around the vacuum spaces, and finally discharged into said channels and from the rear edge of the wing.

4. An aerofoil wing comprising a structure embodying a plurality of supporting ribs spaced apart relative to one another, a plurality of primary blades fixed to and extending from the ribs, a plurality of secondary blades fixed to and extending from the primary blades, and a plurality of tertiary vanes fixed to and extending from the secondary blades, the respective classes of blades and vanes decreasing in area from base to tip, relative to the supporting areas, and decreasing in area individually from base to tip, and having cooperative angles of incidence and contour to enclose a plurality of vacuum spaces, and to form a multiplicity of channels around the vacuum spaces, whereby impinging air currents are entrained, deflected, increased in velocity, transformed into a multiplicity of vortices around the vacuum spaces, and finally discharged from the rear edge of the wing.

5. An aeroplane aerofoil wing, comprising a structure having a longitudinal aerofoil contour, and a lateral aerofoil contour, and embodying a plurality of supporting ribs spaced apart relative to one another, a frame member extending around and connected to all of the ribs, a plurality of primary aerofoil blades fixed to and extending from said ribs, and positioned at a certain angle relative to the supporting rib, a plurality of secondary aerofoil blades fixed to and extending from each primary blade, and positioned at a certain angle relative to the supporting primary blade, and a plurality of tertiary aerofoil vanes fixed to and extending from each secondary blade, and positioned at a certain angle relative to the supporting secondary blade.

6. An aerofoil wing, comprising a wing frame structure having an aerofoil contour from base to tip and an aerofoil contour from the leading edge to the trailing thereof, and a multiplicity of blades carried by said frame structure including a series of diagonally extending blades overlapped at their margins, and a series of blades projecting diagonally from said first named series of blades, said blades being arranged with contiguous blades spaced apart and each of the blades being formed with transverse aerofoil contours so as to deflect and constrict impinging current of air whereby the velocity thereof is increased, and to reunite the air currents on oblique angles of incidence whereby a plurality of vortices are formed and a plurality of vacuums formed by the vortices.

7. An aeroplane aerofoil wing, comprising a structure having an aerofoil contour from base to tip and an aerofoil contour from front edge to rear edge thereof, a plurality of spaced overlapping blades disposed within and supported by the structure, said blades having longitudinal and transverse double curvatures to cause impinging air currents to be deflected, increased in velocity, transformed into a multiplicity of vortices circulating around vacuum spaces and discharged at the rear edge of the wing.

8. An aeroplane aerofoil wing, comprising a structure having an aerofoil contour from base to tip, an aerofoil contour from front edge to rear edge thereof, and a plurality of spaced overlapping blades mounted within and supported by the structure, and arranged to form foraminous walls enclosing a multiplicity of vacuum spaces; said blades having longitudinal and transverse curvatures whereby impinging air currents are deflected, increased in velocity, transformed into a multiplicity of vortices within said vacuum spaces, and discharged at the rear edge of the wing.

9. An aeroplane wing, comprising a structure having an aerofoil contour from base to tip and an aerofoil contour from front edge to the rear edge thereof, and embodying a plurality of supporting and spaced apart ribs, and a plurality of blades supported by the ribs, adjacent of said blades being arranged with an overlap and underlap, and having transverse curvatures presented to form angles of incidence, and being oppositely curved at their overlap and underlap to form and inclose a multiplicity of vacuum spaces and to form channels around the vacuum spaces; whereby impinging air currents are entrained, deflected, increased in velocity, transformed into a multiplicity of vortices around the vacuum spaces, and finally discharged from the rear edge of the wing.

10. In an aeroplane wing, a blade element having a leading edge portion and a trailing edge portion, each of said portions being composed of spaced blades, each of said blades formed with a reverse curved cross section.

11. In an aeroplane wing, a blade element having a leading edge portion and a trailing edge portion, each of said portions being composed of a plurality of spaced blades, each of said blades curved longitudinally and formed with reversed curves in cross section.

12. In an aeroplane wing, a blade element having a leading edge portion and a trailing edge portion, each of said portions being composed of a plurality of spaced blades, each of said blades being longitudinally curved and tapered from their bases to their tips and formed with reversed curves in cross section throughout.

13. In an aeroplane wing, a blade element having a leading edge portion and a trailing edge portion, each of which portions comprises a series of spaced inclined blades, the blades forming the leading edge portion being inclined opposite the blades forming the trailing edge portion, said blades being formed with a reversed curve in cross section.

14. In an aeroplane wing, a blade element having a leading edge portion and a trailing edge portion, each of which portions comprises a series of spaced inclined blades, the blades forming the leading edge portion being inclined opposite the blades forming the trailing edge portion, said blades being tapered longitudinally and formed with reversed curves in cross section throughout.

15. In an aeroplane wing, a blade element having a leading edge portion and a trailing edge portion, each of which portions comprises a series of spaced downwardly inclined blades, the blades forming the leading edge portions being inclined opposite the blades forming the trailing edge portions, the blades forming the leading edge portions being curved longitudinally and the blades forming the trailing edge portions being curved longitudinally with a reversed curvature.

16. In an aeroplane wing, a blade element having a leading edge portion and a trailing edge portion, each of which portions comprises a series of spaced downwardly inclined blades, the blades forming the leading edge portions being inclined opposite the blades forming the leading edge portions being inclined opposite the blades forming the trailing edge portions, the blades forming the leading edge portions being curved longitudinally and the blades forming the trailing edge portions being curved longitudinally with a reversed curvature and being tapered longitudinally.

17. In an aeroplane wing, a blade element having a leading edge portion and a trailing edge portion, each of which portions comprises a series of spaced downwardly inclined blades, the blades forming the leading edge portions being inclined opposite the blades forming the trailing edge portions, the blades forming the leading edge portions being curved longitudinally and the blades forming the trailing edge portions being curved longitudinally with a reversed curvature, the blades also being formed with a reversed curvature in cross section.

18. In an aeroplane wing, a blade element having a leading edge portion and a trailing edge portion, each of which portions comprises a series of spaced downwardly inclined blades, the blades forming the leading edge portions being inclined opposite the blades forming the trailing edge portions, the blades forming the leading edge portions being curved longitudinally and the blades forming the trailing edge portions being curved longitudinally with a reversed curvature, and the blades being tapered longitudinally and formed with reversed curves in cross section.

19. In an aeroplane wing, a blade element having a leading edge portion and a trailing edge portion, each of which portions comprises a series of spaced longitudinally inclined blades, the blades forming the leading edge portion being inclined longitudinally opposite the blades forming the trailing edge portion, and the blades forming the leading edge portions being inclined laterally in a direction opposite the lateral inclination of the blades forming the trailing edge portions.

20. In an aeroplane wing, a blade element having a leading edge portion and a trailing edge portion, each of which portions comprises a series of spaced longitudinally inclined blades, the blades forming the leading edge portion being inclined longitudinally opposite the blades forming the trailing edge portion, and the blades forming the leading edge portions being inclined laterally in a direction opposite the lateral inclination of the blades forming the trailing edge portions, said blades being tapered longitudinally.

21. In an aeroplane wing, a blade element having a leading edge portion and a trailing edge portion, each of which portions comprises a series of spaced longitudinally inclined blades, the blades forming the leading edge portion being inclined longitudinally opposite the blades forming the trailing edge portion, and the blades forming the leading edge portions being inclined laterally in a direction opposite the lateral inclination of the blades forming the trailing edge portions, formed with a reversed curvature in cross section.

22. In an aeroplane wing, a blade element having a leading edge portion and a trailing edge portion, each of which portions comprises a series of spaced longitudinally inclined blades, the blades forming the leading edge portions being inclined longitudinally opposite the blades forming the trailing edge portion, and the blades forming the leading edge portions being inclined laterally in a direction opposite the lateral inclination of the blades forming the trailing edge portion, said blades being tapered longitudinally and formed with reversed curvature in cross section.

23. In an aeroplane wing, a blade element having a leading edge portion and a trailing edge portion each of which portions comprises a series of spaced longitudinally and transversely inclined blades, the blades forming the leading edge portion being inclined longitudinally opposite the blades forming the trailing edge portions and the blades forming the leading edge portions being inclined transversely opposite the blades forming the trailing edge portions and the blades forming the leading edge portions being curved longitudinally and the blades forming the trailing edge portions being curved longitudinally in a reversed curvature.

24. In an aeroplane wing, a blade element having a leading edge portion and a trailing edge portion each of which portions comprises a series of spaced longitudinally and transversely inclined blades, the blades forming the leading edge portion being inclined longitudinally opposite the blades forming the trailing edge portions and the blades forming the leading edge portions being inclined transversely opposite the blades forming the trailing edge portions; the blades forming the leading edge portions being curved longitudinally, and the blades forming the trailing edge portions being curved longitudinally on a reversed curvature and all of the blades being tapered longitudinally.

25. In an aeroplane wing, a blade element having a leading edge portion and a trailing edge portion each of which portions comprises a series of spaced longitudinally and transversely inclined blades, the blades forming the leading edge portion being inclined longitudinally opposite the blades forming the trailing edge portions and the blades forming the leading edge portions being inclined transversely opposite the blades forming the trailing edge portions; the blades forming the leading edge portions being curved longitudinally, and the blades forming the trailing edge portions being curved longitudinally and a reversed curvature, the blades being tapered longitudinally, and formed with a reversed curvature in cross section.

26. In an aeroplane wing, a blade element having a leading edge portion and a trailing edge portion each of which portions comprises a series of spaced longitudinally and transversely inclined blades, the blades forming the leading edge portion being inclined longitudinally opposite the blades forming the trailing edge portions and the blades forming the leading edge portions being inclined transversely opposite the blades forming the trailing edge portions; the blades forming the leading edge portions being curved longitudinally, and the blades forming the trailing edge portions being curved longitudinally on a reversed curvature, the blades being formed with a reversed curve in cross section and tapered longitudinally.

27. In an aeroplane wing, a rib, a series of primary blades projecting from the opposite sides of said rib, a series of secondary blades projecting from the opposite sides of said primary blades, and a series of tertiary vanes projecting from the opposite sides of said secondary blades.

28. In an aeroplane wing, a rib, a series of major primary blades projecting from one side of said rib, a series of minor primary blades projecting from the opposite side of said rib; said blades projecting obliquely from said rib with the major blades arranged at an inclination opposite the inclination of the minor blades, and a series of secondary blades projecting from the opposite sides of said primary blades.

29. In an aeroplane wing, a rib, a series of major primary blades projecting from one side of said rib, a series of minor primary blades projecting from the opposite side of said rib; said blades projecting obliquely from said rib with the major blades arranged at an inclination opposite the inclination of the minor blades, and a series of secondary blades projecting from the opposite sides of said primary blades, said secondary blades projecting obliquely from the opposite sides of the primary blades with the secondary blades on one side of the primary blades inclined in the direction opposite the inclination of the secondary blades on the other side of the primary blades.

30. An aeroplane wing comprising a plurality of main blades having leading edges and trailing edges with adjacent blades arranged with the leading edges overlapping the trailing edges of contiguous blades, each of the blades embodying in its ensemble, a rib, obliquely extending primary vanes on opposite sides of said rib, obliquely extending tertiary vanes on each of said secondary blades, all of the blades and vanes being of aerofoil contour, curved and tapered longitudinally with adjacent blades and vanes spaced apart.

31. An aeroplane wing comprising a series of main blades of substantially serpentine general cross section and having a leading edge portion and a trailing edge portion, said blades being arranged to form a wall with the leading edge portions of the blades overlapping the trailing edge portions of the contiguous blade, the overlapping portion of adjacent blades being outwardly curved relatively to each other with the margins of said portions leading the contiguous blades, each of said main blades including in its ensemble a rib, a series of spaced primary blades extending obliquely from the opposite side of said rib, a series of spaced secondary blades extending obliquely from the opposite sides of said primary blades, and a series of spaced tertiary vanes extending obliquely from the opposite sides of said secondary blades, said primary blades, secondary blades, and tertiary vanes being of approximately S-shaped cross section and converging from their root toward their tips and being of general elongated curvilinear form; said secondary blades and tertiary vanes constituting primary blades, said secondary blades being of general aerofoil cross section with leading edge portions, and trailing edge portions and being arranged with the leading edge portions of the secondary blades overlapping the trailing edge portions of adjacent secondary blades; and said tertiary vanes being of general aerofoil cross section with leading edge portions and trailing edge portions and being arranged with the leading edge portions of each tertiary vane overlapping the trailing edge portions of adjacent tertiary vanes.

JAY H. MONTGOMERY.